(12) United States Patent
Ando (10) Patent No.: US 7,146,173 B2
(45) Date of Patent: Dec. 5, 2006

(54) METHOD AND NETWORK FOR ANSWERING CALLS TO MOBILE TERMINALS ACCORDING TO USER-DEFINED RESPONSE MODES

(75) Inventor: Takeshi Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 243 days.

(21) Appl. No.: 10/124,330

(22) Filed: Apr. 18, 2002

(65) Prior Publication Data

US 2002/0155841 A1    Oct. 24, 2002

(30) Foreign Application Priority Data

Apr. 20, 2001    (JP)    ............................. 2001-123518

(51) Int. Cl.
*H04Q 7/20*    (2006.01)
(52) U.S. Cl. ..................... 455/452.1; 455/417; 455/445
(58) Field of Classification Search ............. 455/414.1, 455/417, 422.1, 423, 67.1, 68–70, 426.2, 455/452.1, 458, 456.4, 445; 379/93.17, 93.23, 379/229, 142, 357, 188
See application file for complete search history.

(56) References Cited

U.S. PATENT DOCUMENTS

| | | | | |
|---|---|---|---|---|
| 5,128,959 | A  * | 7/1992  | Bruckert | 370/335 |
| 5,193,216 | A  * | 3/1993  | Davis | 455/67.7 |
| 5,692,032 | A  * | 11/1997 | Seppanen et al. | 455/466 |
| 5,930,701 | A  * | 7/1999  | Skog | 455/415 |
| 5,995,843 | A  * | 11/1999 | Sjodin et al. | 455/462 |
| 6,021,190 | A    | 2/2000  | Fuller et al. | |
| 6,052,563 | A  * | 4/2000  | Macko | 340/7.1 |
| 6,317,607 | B1 * | 11/2001 | Tomcik et al. | 455/552.1 |
| 6,321,068 | B1 * | 11/2001 | Zamat | 455/69 |
| 6,347,225 | B1 * | 2/2002  | Nishiyama | 455/412.1 |
| 6,400,318 | B1 * | 6/2002  | Kasami et al. | 342/383 |
| 6,418,329 | B1 * | 7/2002  | Furuya | 455/566 |
| 6,456,976 | B1 * | 9/2002  | Kuita | 704/273 |
| 6,556,235 | B1 * | 4/2003  | Saburi | 348/14.02 |
| 2001/0031633 | A1 * | 10/2001 | Tuomela et al. | 455/417 |
| 2002/0004413 | A1 * | 1/2002  | Inoue | 455/566 |
| 2003/0144003 | A1 * | 7/2003  | Ranta et al. | 455/450 |

FOREIGN PATENT DOCUMENTS

| | | |
|---|---|---|
| GB | 2 366 947 A | 3/2002 |
| JP | 2-67829 A | 3/1990 |
| JP | 4-258030 A | 9/1992 |
| JP | 6-165246 A | 6/1994 |
| JP | 10-98437 A | 4/1998 |
| JP | 11-18159 A | 1/1999 |

(Continued)

*Primary Examiner*—Jean Gelin
(74) *Attorney, Agent, or Firm*—Sughrue Mion, PLLC (57) ABSTRACT

In a mobile communication network, a mobile terminal is set in one of a number of user-defined response modes. The information indicating the set response mode is stored in a status memory, and the stored information is transmitted to the calling user of an incoming call addressed to the mobile terminal from the network. The status memory is preferably located in the network to respond to the incoming call by the network, or may be located in the mobile terminal to respond to the incoming call by the mobile terminal. Preferably, verification is provided for the calling user prior to responding to the incoming call. A field strength or signal-to-noise ratio detector may be provided to communicate the field strength or SNR value of the channel established by the mobile terminal. The calling user is informed of such channel quality information to determine the best communication mode.

32 Claims, 6 Drawing Sheets

FOREIGN PATENT DOCUMENTS

| | | |
|---|---|---|
| JP | 11-239379 A | 8/1999 |
| JP | 2000-41282 A | 2/2000 |
| JP | 2000-188781 A | 7/2000 |
| JP | 2001-8263 A | 1/2001 |
| JP | 2001-053865 A | 2/2001 |
| JP | 2001-78272 A | 3/2001 |
| WO | WO 98/25395 A1 | 6/1998 |

* cited by examiner

FIG. 1

FIG. 2
MOBILE TERMINAL

FIG. 4

FIG. 5
MOBILE TERMINAL

US 7,146,173 B2

METHOD AND NETWORK FOR ANSWERING CALLS TO MOBILE TERMINALS ACCORDING TO USER-DEFINED RESPONSE MODES

BACKGROUND OF THE INVENTIONS

1. Field of Invention

The present invention relates generally to mobile communication networks and more specifically to a method and network for responding to incoming calls.

2. Description of the Related Art

With the increasing number of mobile terminals for personal communications along with the introduction of new and convenient services and features, mobile users are increasingly required to observe social standard. In particular, when a mobile user is in an environment where no incoming calls from external sources are prohibited, the mobile user has to set his mobile unit in a silence mode. Although the ringing signal is only perceived by the user, speech communication can disturb the atmosphere of the environment. To avoid this problem, the mobile terminal may be completely shutdown. However, the calling user has no way of knowing whether the battery power of the mobile terminal has simply run out or the mobile terminal is intentionally switched off.

Japanese Patent Publication 11-18159 discloses a mobile terminal in which a GPS (global positioning system) location detector is provided for communicating the location of the mobile terminal to the calling party so that unlimited attempts to reach that mobile terminal are prevented. Another technique disclosed by Japanese Patent Publication 2000-188781 utilizes two base station identifiers. A first base station automatically sets a mobile terminal in a silence mode when the identifier of this base station matches a first base station identifier stored in the mobile terminal. This silence mode is continued until the mobile terminal enters the cell of a second base station. When the identifier of the second base station coincides with a second base station identifier stored in the mobile terminal, the silence mode is released, restoring the mobile terminal to normal.

However, there is still a need for optimizing the mode of response to an incoming call according to a number of different situations.

SUMMARY OF THE INVENTION

It is therefore an object of the present invention to provide a method and network that responds to incoming calls according to one of a plurality of user-defined answer modes.

According to a first aspect of the present invention, there is provided a communication method for a mobile communication network including a plurality of wireless base stations to which mobile terminals are accessible. The method comprises the steps of setting a mobile terminal in one of a plurality of response modes according to user instructions, storing information indicating the set response mode in a status memory, and transmitting the stored information to a calling user of an incoming call addressed to the mobile terminal from the network. The status memory is preferably located in the network to respond to the incoming call by the network, or may be located in the mobile terminal to respond to the incoming call by the mobile terminal. Preferably, verification is provided for the calling user prior to responding to the incoming call.

The mobile user of the present invention is able to update the stored status information to meet varying conditions of the environment in which the mobile terminal is in.

A field strength or signal-to-noise ratio detector may be provided to store information in the status memory indicating the field strength or SNR value of the communication channel established between the mobile terminal and the mobile network. The calling user is informed of such channel quality information, thus allowing the calling user to determine the best communication mode. If the channel quality is high, data communication will best fit the situation. If the channel quality is low, speech communication may be chosen.

According to a second aspect, the present invention provides a mobile communication network including a mobile switching center and a plurality of wireless base stations connected to the mobile switching center. The network comprises a mobile terminal accessible to one of the base station, the mobile terminal including a keypad for entering user instructions and a control processor for setting the mobile terminal in one of a plurality of response modes according to the entered user instructions and transmitting information indicating the set response mode to the network, a status memory for storing the transmitted information, and a response device for transmitting the stored information to a calling user of an incoming call addressed to the mobile terminal,

BRIEF DESCRIPTION OF THE DRAWINGS

The present invention will be described in detail further with reference to the following drawings, in which.

DETAILED DESCRIPTION

Figure 1:
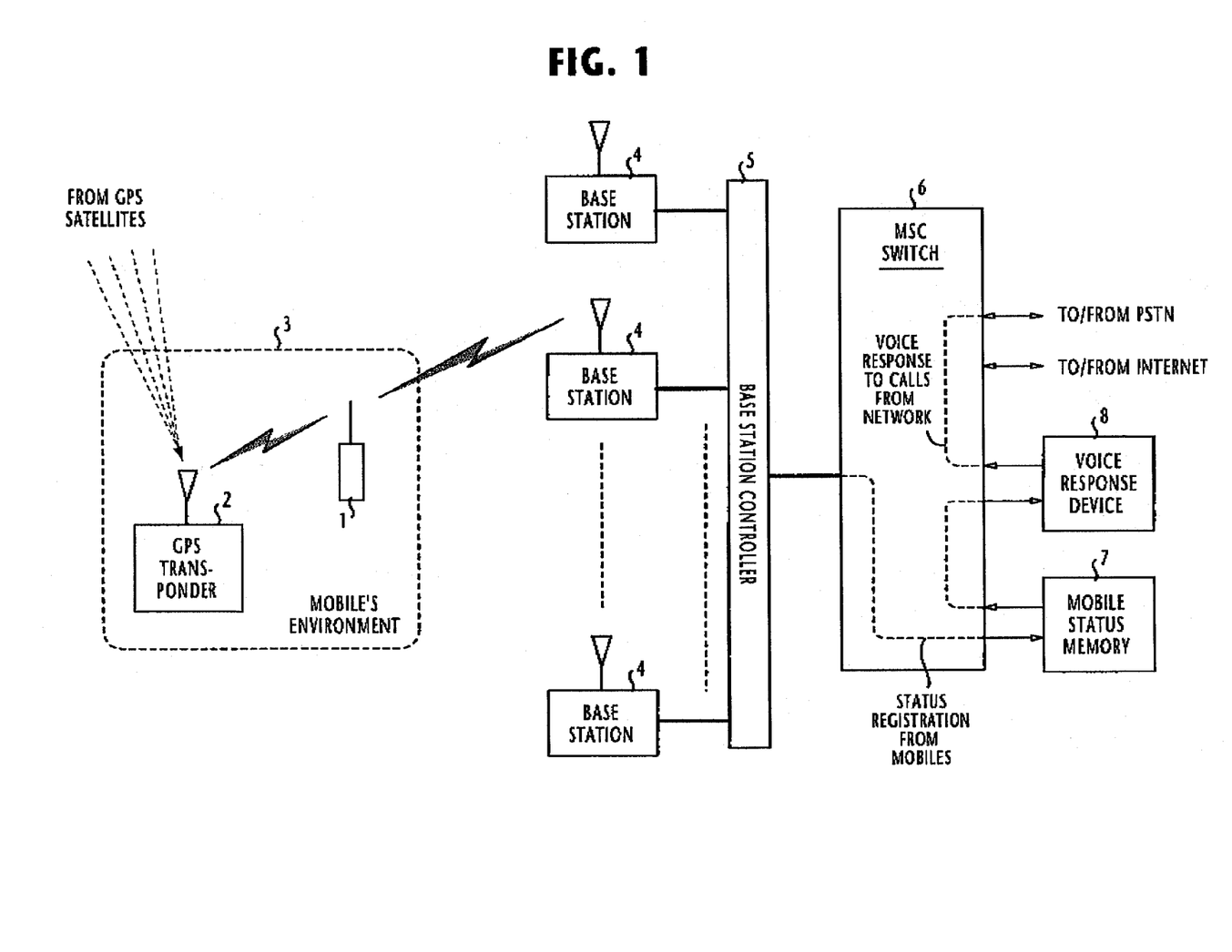
FIG. 1 is a block diagram of a mobile communication network according to a first embodiment of the present invention.

The mobile communication network of the first embodiment of the present invention, shown in FIG. 1, is comprised of a plurality of cell-site base stations 4 connected via a base station controller 5 to an MSC (mobile switching center) switch 6, which is in turn connected to a public switched telephone network (PSTN) and the Internet. A mobile status memory 7 and a voice response device 8 are connected to the MSC switch 6.

A mobile terminal 1 is located in an environment 3 in which a GPS (global positioning system) navigation system, or transponder 2 is provided. Environment 3 is one in which the mobile communication is undesirable for safety such as the passenger compartment of an automobile or private communication is prohibited for meeting in public places. The GPS transponder 2 receives global positioning data from satellites, determines the global position of the environment 3 and broadcasts a wireless position data signal, which is received by the mobile terminal 1. Alternatively, the GPS navigation system 2 may be located within the mobile communication network and the mobile terminal 1 is designed to receive a position indicating signal from the network's navigation system so that the calling user can constantly recognize the precise location of the mobile terminal.

Figure 2:
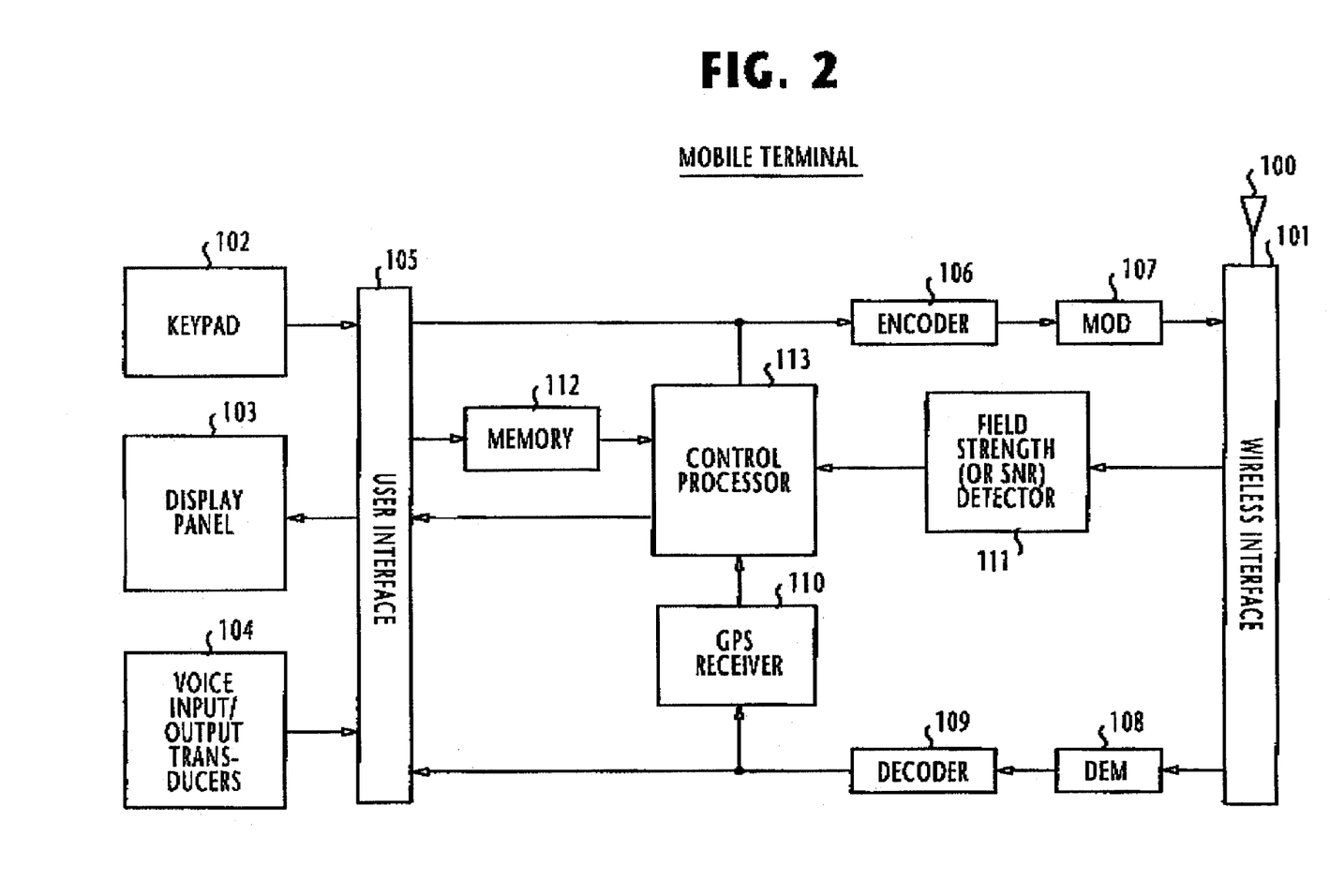
FIG. 2 is a block diagram of a wireless mobile terminal of the first embodiment of the invention.

As shown in FIG. 2, the mobile terminal 1 operates with an antenna 100 to communicate with one of the base stations 4 via a wireless interface 101. A keypad 102, a display panel 103 and voice input/output transducers 104 are connected to a user interface 105. Between the interfaces 101 and 105 are provided various electronic circuitry including a digital transmission circuit formed by an encoder 106 and a modulator 107 and a digital reception circuit formed by a demodulator 108 and a decoder 109. A GPS receiver 110 is connected to the output of decoder 109 to receive the signal from the transponder 2. A field strength (or SNR) detector 111 is provided to detect the field strength of a signal from base stations 4 or the signal-to-noise ratio (SNR) of a base-transmitted signal. The user of the terminal enters mobile status data via the keypad 102 into a memory 112. The outputs of GPS receiver 110, field strength (or SNR) detector 111 and memory 112 are supplied to and processed by a control processor 113. The signals processed by the control processor 113 are supplied to the display panel 103 for indicating prompt messages for urging the user to enter necessary data and to the encoder 106 for transmission to the network.

Figure 3:
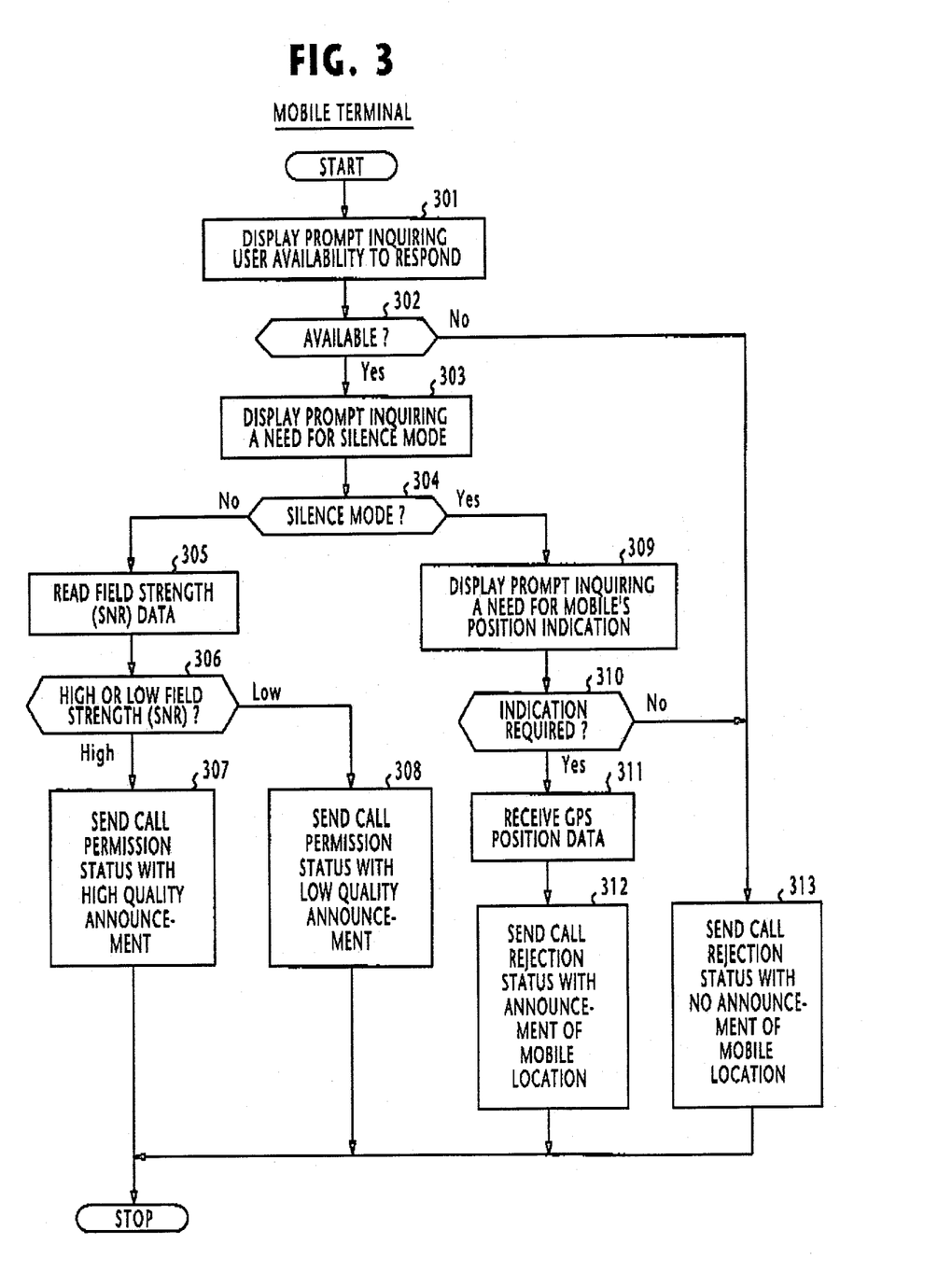
FIG. 3 is a flowchart of the operation of the control processor of FIG. 2 when mobile status information is sent to the mobile status memory of FIG. 1.

In the first embodiment of the present invention, the operation of the control processor 113 proceeds according to the flowchart of FIG. 3.

When the user operates the keypad 102 to set the mobile terminal in a desired mode, the control processor 113 displays a prompt message on the display panel 103 to urge the user to enter information indicating whether or not the user is available to respond to incoming calls (step 301) and proceeds to step 302. Depending on the environment, the user enters information indicating the user's availability to respond to incoming calls if the environment allows telephonic speech communication or information indicating otherwise. If the control processor 113 determines that the user is available to respond to incoming calls, flow proceeds to step 303 to display a prompt message urging the user to enter information indicating whether there is a need to set the mobile terminal in a silence mode. If the user enters information indicating that silence mode is not required (step 304), flow proceeds to step 305 to read the field strength (or SNR) data from the detector 111 and determines, at step 306, whether the detected field strength (SNR) is higher or lower than a predetermined value. If the field strength (SNR) is higher than the predetermined value, the control processor advances to step 307 to transmit a call permission status signal with a high channel quality announcement to a base station to indicate that an incoming call will be answered by the mobile terminal and a high quality channel is ensured. If decision step 306 indicates that the field strength (SNR) is lower than the predetermined value, flow proceeds to step 308 to transmit a call permission status signal with a low channel quality announcement to the base station to indicate that an incoming call can be answered by the mobile terminal but high channel quality is not ensured. If the SNR value is communicated to the calling terminal and displayed on that terminal, the calling user may recognize and determine an appropriate transmission speed for sending data to the mobile terminal, instead of establishing a speech communication.

If the decision at step 304 indicates that the user is desirous of a silence mode, flow proceeds to step 309 to display a prompt message inquiring the user whether there is a need for indicating the mobile's position to an incoming call. If this is the case, the user will enter such information and step 310 yields an affirmative decision, and the control processor receives the position signal from the GPS receiver 110 (step 311). At step 312, the control processor transmits a call rejection status signal to the network with an announcement of the mobile's position. If the user has entered information indicating that no position announcement is necessary, the decision at step 310 is negative and flow proceeds to step 313 to transmit a call rejection status signal to the network with no announcement as to the location of the mobile terminal.

The signals transmitted by steps 307, 308, 312 and 313 are received by the mobile switching center and stored in the mobile status memory 7.

On receiving a call from the PSTN that is destined for the mobile terminal 1, the MSC switch 6 accesses the mobile status memory 7 and checks for the presence of any mobile status information (i,e., call permission status signal or call rejection status signal). If there is one, the MSC switch 6 determines whether the calling terminal is authenticated by the mobile terminal based on verification information transmitted from the caller. If the calling party is verified, the MSC switch 6 reads the mobile status information from the memory 7 into the voice response device 8. Voice response device 8 converts the mobile status information into a voice signal and transmits it to the network's calling user. If the announcement from the vocal response device is a call permission status signal, the MSC switch proceeds to connect the calling user to the called mobile terminal. If the channel quality is high, the calling user may choose to send data signals. If the channel quality is low, the calling user may choose to proceeds with a speed communication, If the announcement from the voice response device is a call rejection status signal, the calling user will make a call attempt at a later time or send an e-mail via the internet if an early response from the mobile terminal is desired. The mobile's location announcement from the voice response device gives a sense of relief to the calling user even if the called party is not available to respond to the call. The absence of such location announcement gives the calling party an impression that the mobile terminal is in an environment such as hospitals in which it is switched off to prevent its radio frequency radiation from interfering with the diagnostic equipment.

In this way, calling users can precisely recognize the current status of a called mobile terminal before they make a further call attempt.

Figure 4:
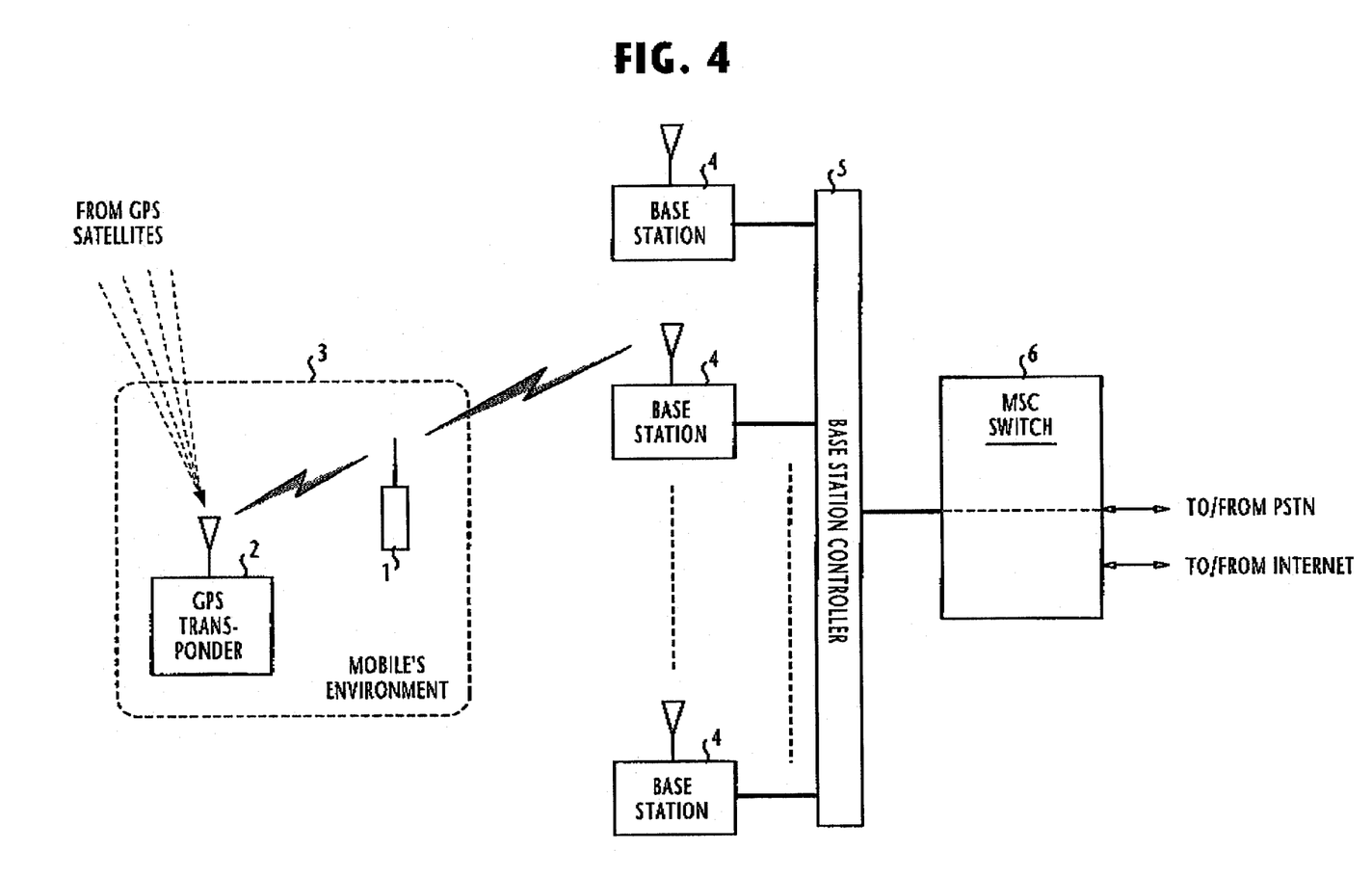
FIG. 4 is a block diagram of a mobile communication network according to a second embodiment of the present invention.
Figure 5:
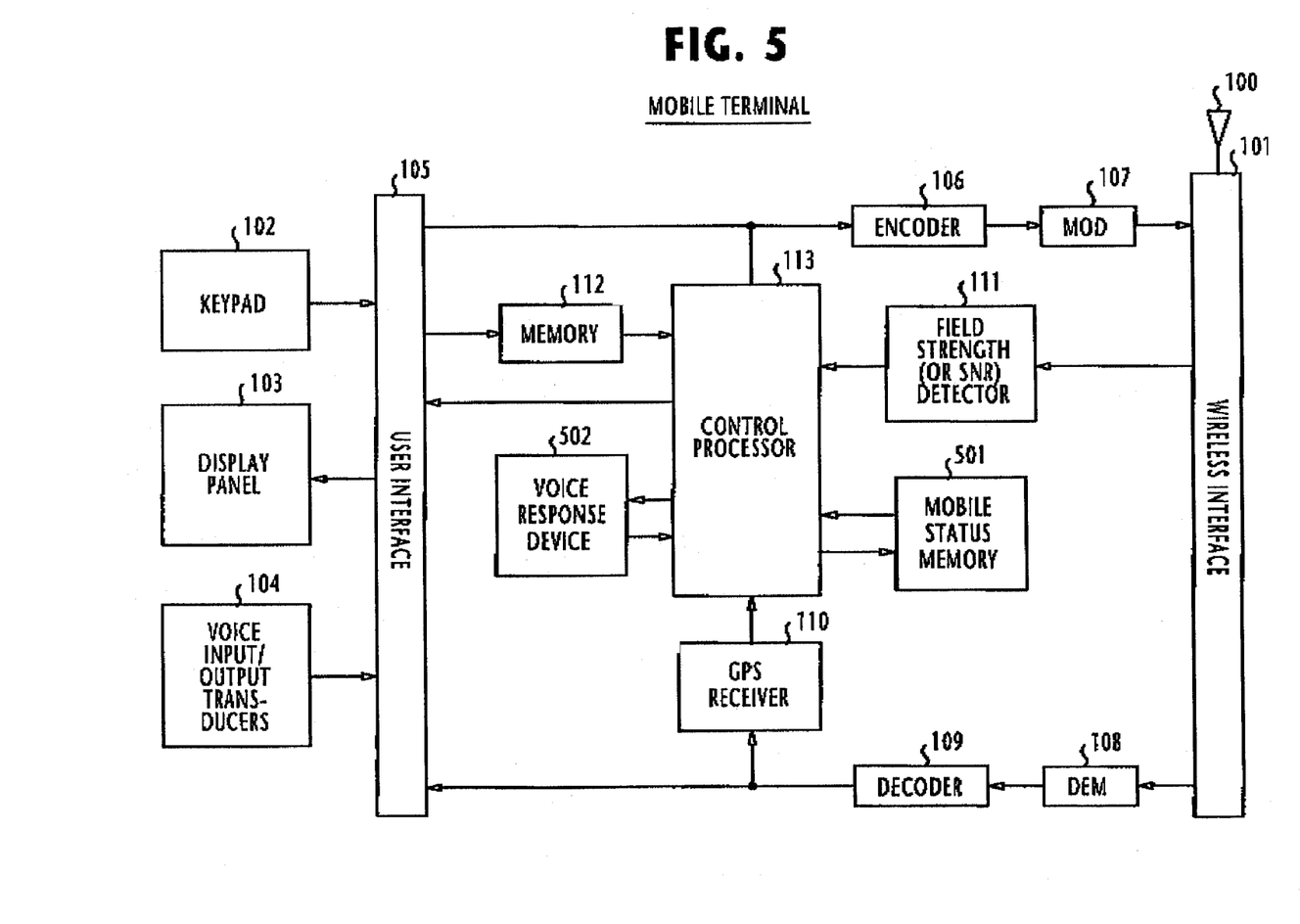
FIG. 5 is a block diagram of a wireless mobile terminal of the second embodiment of the invention.

The present invention is modified as shown in FIG. 4 in which the mobile status memory 7 and voice response device 8 of FIG. 1 are removed from the mobile switching center and installed in the mobile terminal and connected to the control processor 113 as indicated by numerals 501 and 502, respectively, in FIG. 5.

Figure 6:
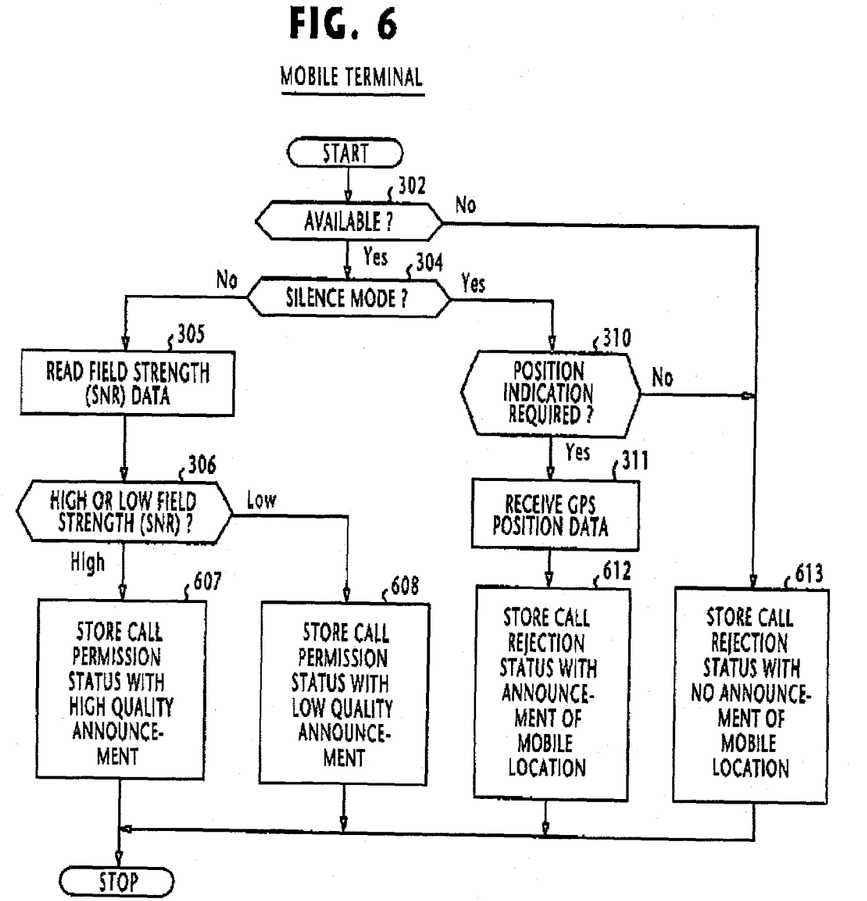
FIG. 6 is a flowchart of the operation of the control processor of FIG. 5 when mobile status information is stored in memory.

The operation of the control processor 113 of FIG. 5 proceeds according to the flowchart of FIG. 6, in which parts corresponding in significance to those in FIG. 3 are marked with the same numerals as used in FIG. 3. In FIG. 6, it will be seen that prompt display steps 301, 303 and 309 of FIG.

3 are removed. Instead, the user enters necessary data into the memory 112 during the time prior to setting the mobile terminal in one of the call permission or call rejection states. Control processor 113 examines the data in the memory 112 without displaying the prompt messages. Since the mobile status memory 501 is provided in the mobile terminal 1, the control processor stores the call permission and rejection status signals in this memory at steps 607, 608,612 and 613, rather than sending them to the network.

Figure 7:
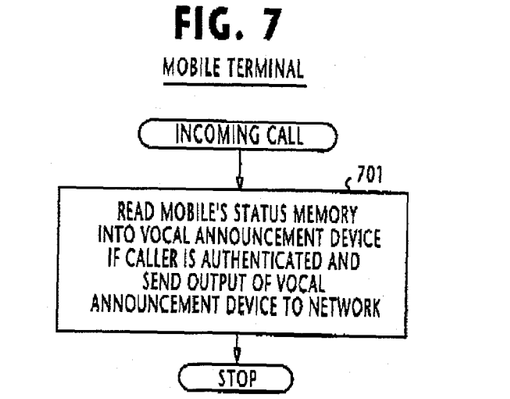
FIG. 7 is a flowchart of the operation of the control processor of FIG. 5 when it reads the stored information in response to the mobile terminal receiving an incoming call from the network.

In FIG. 7, when the mobile terminal receives an incoming call (step 701), the control processor checks to see if the calling party is authenticated, and if so, it reads the status information from the memory 501 into the voice response device 502 and transmits the output of the latter to the network.

What is claimed is:

1. A communication method for a mobile communication network including a plurality of wireless base stations to which mobile terminals are accessible, comprising the steps of:
   a) setting a mobile terminal in one of a plurality of response modes according to user instructions;
   b) storing response information corresponding to the set response mode and storing a response message in a status memory;
   c) transmitting the stored response information and transmitting said response message to a calling user of an incoming call addressed to said mobile terminal from said network;
   detecting, at said mobile terminal, the field strength of a signal from said network;
   storing information indicating the detected field strength in said status memory; and
   transmitting the stored field strength information to said calling user of incoming call.

2. A communication method for a mobile communication network including a plurality of wireless base stations to which mobile terminals are accessible, comprising the steps of:
   a) setting a mobile terminal in one of a plurality of response modes according to user instructions;
   b) storing response information corresponding to the set response mode and storing a response message in a status memory;
   c) transmitting the stored response information and transmitting said response message to a calling user of an incoming call addressed to said mobile terminal from said network;
   detecting, at said mobile terminal, the signal-to-noise ratio of a signal from said network;
   storing information indicating the detected signal-to-noise ratio in said status memory; and
   transmitting the stored signal-to-noise ratio information to said calling user of incoming call.

3. The communication method of claim 1 or 2, wherein said plurality of response modes includes a first call permission mode with a vocal announcement indicating that said mobile terminal has a relatively high channel quality and a second call permission mode with a vocal announcement indicating that said mobile terminal has a relatively low channel quality.

4. The communication method of claim 1 or 2, further comprising the steps of:
   receiving, at said mobile terminal, a position signal indicating a current location of said mobile terminal from a navigation system that produces said position signal from signals received from global positioning system (GPS) satellites;
   storing the position signal in said status memory; and
   transmitting the stored position signal to said calling user of incoming call.

5. The communication method of claim 4, wherein said plurality of response modes comprises a call rejection mode with a vocal announcement indicating the location of said mobile terminal according to the stored position signal and a call rejection mode with no vocal announcement of the location of said mobile terminal.

6. The communication method of claim 4, wherein said navigation system is located in an automotive vehicle.

7. The communication method of claim 4, wherein said navigation system is located in a public place.

8. The communication method of claim 4, wherein said navigation system is located in said mobile communication network.

9. A mobile communication network including a mobile switching center and a plurality of wireless base stations connected to said mobile switching center, comprising:
   a mobile terminal accessible to one of said base station, the mobile terminal including a keypad for entering user instructions and a control processor for setting the mobile terminal in one of a plurality of response modes according to the entered user instructions and transmitting information indicating the set response mode to said network;
   a status memory for storing response information corresponding to the set response mode and a response message;
   a response device for transmitting the stored response information and the response message to a calling user of an incoming call addressed to said mobile terminal; and
   a field strength detector for detecting the field strength of a signal from said network, wherein said control processor of the mobile terminal stores information indicating the detected field strength in said status memory, and said response device transmits the stored field strength information to said calling user of incoming call.

10. A mobile communication network including a mobile switching center and a plurality of wireless base stations connected to said mobile switching center, comprising:
   a mobile terminal accessible to one of said base station, the mobile terminal including a keypad for entering user instructions and a control processor for setting the mobile terminal in one of a plurality of response modes according to the entered user instructions and transmitting information indicating the set response mode to said network;
   a status memory for storing response information corresponding to the set response mode and a response message;
   a response device for transmitting the stored response information and the response message to a calling user of an incoming call addressed to said mobile terminal; and
   a signal-to-noise ratio detector for detecting the signal-to-noise ratio of a signal from said network, wherein said control processor of the mobile terminal stores information indicating the detected signal-to-noise ratio in said status memory, and said response device transmits the stored signal-to-noise ratio information to said calling user of incoming call.

11. The communication network of claim 9 or 10, wherein said plurality of response modes includes a first call permission mode with a vocal announcement indicating that said mobile terminal has a relatively high channel quality and a second call permission mode with a vocal announcement indicating that said mobile terminal has a relatively low channel quality.

12. The communication network of claim 9 or 10, further comprising a navigation system that produces a position signal from signals received from global positioning system satellites, wherein said mobile terminal comprises:
    a position signal receiver for receiving a position signal indicating a current location of said mobile terminal from said navigation system; and
    a control processor for storing the position signal in said status memory, and transmitting the stored position signal to said calling user of incoming call.

13. The communication network of claim 12, wherein said plurality of response modes comprises a call rejection mode with a vocal announcement indicating the location of said mobile terminal according to the stored position signal, and a call rejection mode with no vocal announcement of the location of said mobile terminal.

14. The communication network of claim 12, wherein said navigation system is located in an automotive vehicle.

15. The communication network of claim 12, wherein said navigation system is located in a public place.

16. The communication network of claim 12, wherein said navigation system is located in said mobile communication network.

17. A communication method for a mobile communication network including a plurality of wireless base stations to which mobile terminals are accessible, comprising the steps of:
    a) setting a mobile terminal in one of a plurality of response modes according to user instructions;
    b) storing information corresponding to the set response mode in a status memory;
    c) transmitting the stored information to a calling user of an incoming call addressed to said mobile terminal from said network;
    d) detecting, at said mobile terminal, the field strength of a signal from said network;
    e) storing information indicating the detected field strength in said status memory; and
    f) transmitting the stored field strength information to said calling user of incoming call.

18. A communication method for a mobile communication network including a plurality of wireless base stations to which mobile terminals are accessible, comprising the steps of:
    a) setting a mobile terminal in one of a plurality of response modes according to user instructions;
    b) storing information corresponding to the set response mode in a status memory;
    c) transmitting the stored information to a calling user of an incoming call addressed to said mobile terminal from said network;
    d) detecting, at said mobile terminal, the signal-to-noise ratio of a signal from said network;
    e) storing information indicating the detected signal-to-noise ratio in said status memory; and
    f) transmitting the stored signal-to-noise ratio information to said calling user of incoming call.

19. The communication method of claim 17 or 18, further comprising the steps of:
    receiving, at said mobile terminal, a position signal indicating a current location of said mobile terminal from a navigation system that produces said position signal from signals received from global positioning system (GPS) satellites;
    storing the position signal in said status memory; and
    transmitting the stored position signal to said calling user of incoming call.

20. The communication method of claim 17 or 18, wherein said plurality of response modes includes a first call permission mode with a vocal announcement indicating that said mobile terminal has a relatively high channel quality and a second call permission mode with a vocal announcement indicating that said mobile terminal has a relatively low channel quality.

21. The communication method of claim 20, wherein said plurality of response modes comprises a call rejection mode with a vocal announcement indicating the location of said mobile terminal according to the stored position signal and a call rejection mode with no vocal announcement of the location of said mobile terminal.

22. The communication method of claim 20, wherein said navigation system is located in an automotive vehicle.

23. The communication method of claim 20, wherein said navigation system is located in a public place.

24. The communication method of claim 20, wherein said navigation system is located in said mobile communication network.

25. A mobile communication network including a mobile switching center and a plurality of wireless base stations connected to said mobile switching center, comprising:
    a mobile terminal accessible to one of said base station, the mobile terminal including a keypad for entering user instructions and a control processor for setting the mobile terminal in one of a plurality of response modes according to the entered user instructions and transmitting information indicating the set response mode to said network;
    a status memory for storing response information corresponding to the set response mode and a response message;
    a response device for transmitting the stored response information and the response message to a calling user of an incoming call addressed to said mobile terminal; and
    wherein said mobile terminal further comprises a field strength detector for detecting the field strength of a signal from said network, wherein said control processor of the mobile terminal stores information indicating the detected field strength in said status memory, and said response device transmits the stored field strength information to said calling user of incoming call.

26. A mobile communication network including a mobile switching center and a plurality of wireless base stations connected to said mobile switching center, comprising:
    a mobile terminal accessible to one of said base station, the mobile terminal including a keypad for entering user instructions and a control processor for setting the mobile terminal in one of a plurality of response modes according to the entered user instructions and transmitting information indicating the set response mode to said network;
    a status memory for storing response information corresponding to the set response mode and a response message; and a response device for transmitting the stored response information and the response message to a calling user of an incoming call addressed to said mobile terminal; and wherein said mobile terminal further comprises a signal-to-noise ratio detector for detecting the signal-to-noise ratio of a signal from said network, wherein said control processor of the mobile terminal stores information indicating the detected signal-to-noise ratio in said status memory, and said response device transmits the stored signal-to-noise ratio information to said calling user of incoming call.

27. The communication network of claim 25 or 26, wherein said plurality of response modes includes a first call permission mode with a vocal announcement indicating that said mobile terminal has a relatively high channel quality and a second call permission mode with a vocal announcement indicating that said mobile terminal has a relatively low channel quality.

28. The communication network of claim 25 or 26, further comprising a navigation system that produces a position signal from signals received from global positioning system satellites, wherein said mobile terminal comprises:

a position signal receiver for receiving a position signal indicating a current location of said mobile terminal from said navigation system; and a control processor for storing the position signal in said status memory, and transmitting the stored position signal to said calling user of incoming call.

29. The communication network of claim 28, wherein said plurality of response modes comprises a call rejection mode with a vocal announcement indicating the location of said mobile terminal according to the stored position signal, and a call rejection mode with no vocal announcement of the location of said mobile terminal.

30. The communication network of claim 28, wherein said navigation system is located in an automotive vehicle.

31. The communication network of claim 28, wherein said navigation system is located in a public place.

32. The communication network of claim 28, wherein said navigation system is located in said mobile communication network.

* * * * *

UNITED STATES PATENT AND TRADEMARK OFFICE
CERTIFICATE OF CORRECTION

PATENT NO. : 7,146,173 B2 Page 1 of 1
APPLICATION NO. : 10/124330
DATED : December 5, 2006
INVENTOR(S) : Ando It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (243) days Delete the phrase "by 243" and insert -- by 334 days --

Signed and Sealed this

Second Day of December, 2008

JON W. DUDAS
*Director of the United States Patent and Trademark Office*